June 10, 1947.     A. COX     2,421,927
OPTICAL OBJECTIVE OF THE TELEPHOTO TYPE
Filed Dec. 13, 1945
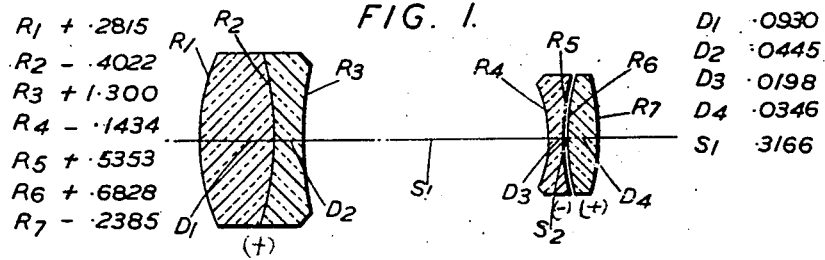
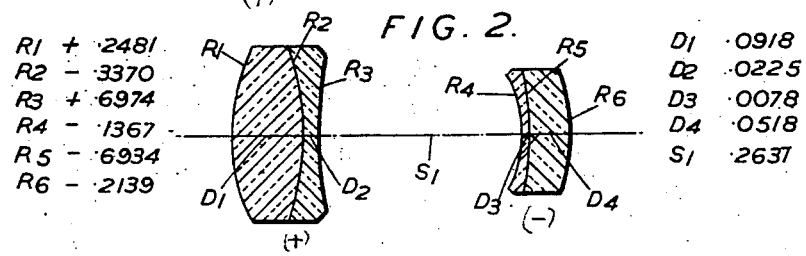
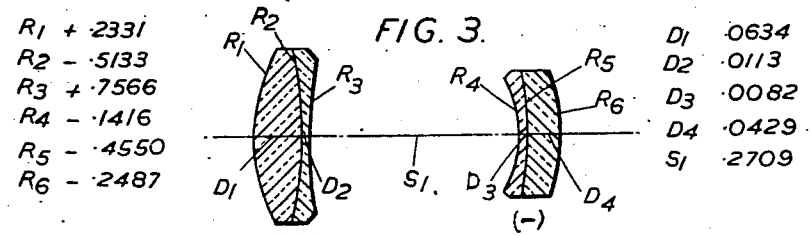
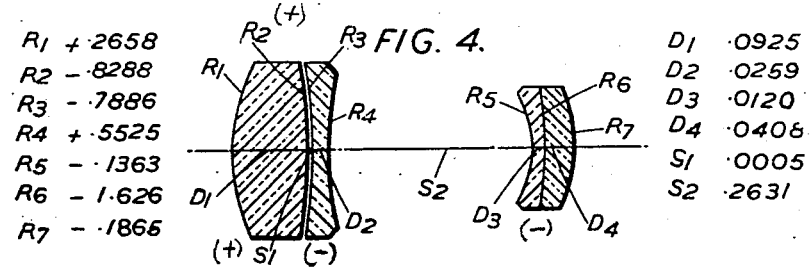
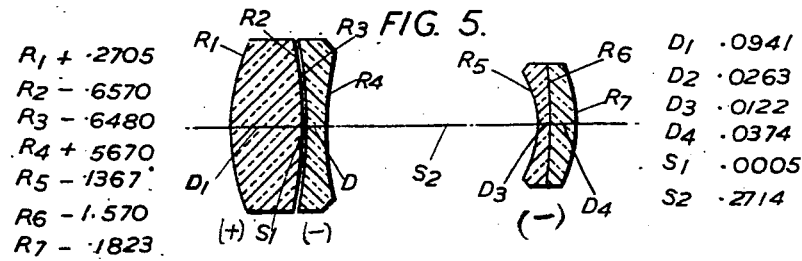
Inventor
ARTHUR COX
by
Emery, Holcombe & Blair
Attorney Patented June 10, 1947

2,421,927

UNITED STATES PATENT OFFICE 2,421,927

OPTICAL OBJECTIVE OF THE TELEPHOTO TYPE

Arthur Cox, Leicester, England, assignor to Taylor, Taylor & Hobson Limited, Leicester, England, a company of Great Britain Application December 13, 1945, Serial No. 634,674
In Great Britain January 16, 1945

22 Claims. (Cl. 88—57)

This invention relates to optical objectives of the telephoto type, corrected for spherical and chromatic aberrations, coma, astigmatism and field curvature, and comprising a front convergent doublet member separated by a considerable air space from a rear divergent doublet member. It is to be understood that the terms "front" and "rear" as herein used relate to the sides of the objective respectively nearer to and further from the longer conjugate in accordance with the usual convention.

The primary object of the invention is to provide a higher degree of correction for spherical aberration than has hitherto been obtained in objectives of this type corrected for an aperture of say F/4 or F/4.5 without unduly increasing the overal axial length of the objective. Thus the invention enables spherical aberration to be so well corrected that the maximum deviation from the paraxial focus of any ray initially parallel to the axis is not greater than 0.3 per cent of the equivalent focal length of the objective.

The objective according to the present invention comprises a front convergent doublet member having its front surface convex to the front and its internal contact surfaces concave to the front and separated by an axial air space lying between .25 and .35 times the equivalent focal length of the objective from a rear divergent member having its front and rear surfaces concave to the front, the front surfaces of the convergent front member and of the divergent rear member having radii of curvature respectively lying between .22 and .35 and between .125 and .20 times such equivalent focal length, all four elements being made of materials having mean refractive index greater than 1.61. The numerical sum of the radii of curvature of the front surface of the convergent front member and of the rear surface of the divergent rear member preferably lies between .44 and .54 times the equivalent focal length of the objective.

It is not essential to the invention that the two elements of each doublet member should be cemented together, but, if they are not, the axial air space between them should not exceed .010 times the equivalent focal length of the objective.

The internal contact surfaces of the convergent front member, whether cemented together or not, preferably have radii of curvature lying between .25 and 1.5 times the equivalent focal length of the objective. When such surfaces are cemented together, the front element is preferably made of a material having mean refractive index less than and Abbé V number greater than that of the material of the associated rear element, the difference between such refractive indices lying between .040 and .130. When these surfaces are not cemented, however, the radius of curvature of the rear surface of the front element is preferably greater than that of the front surface of the associated rear element, the difference in curvature between these two surfaces being not greater than .20 times the equivalent power of the objective.

When the internal contact surfaces of the divergent rear member are not cemented, the difference in curvature between such surfaces conveniently lies between .20 and 1.00 times the equivalent power of the objective. In such case the surfaces are preferably separated by a meniscus-shaped air space whose axial thickness is greater than its marginal thickness.

Amongst other features which, although not essential to the invention, are preferably employed, may be mentioned the following. The rear surface of the convergent front member may be concave to the front with radius of curvature between .4 and 2.0 times the equivalent focal length of the objective. The rear surface of the divergent rear member may be concave to the front with radius of curvature between .16 and .35 times such equivalent focal length. The Abbé V numbers of the materials used for the front element and for the rear element of the convergent front member may respectively be not less than 40.0 and not greater than 32.5. The Abbé V number of the material used for the front element of the divergent rear member may be greater by at least 10.0 than that for the rear element of such member.

Figures 1 to 5 of the accompanying drawings respectively illustrate five convenient alternative practical examples of telephoto objective according to the invention, and numerical data for these examples are given in the following tables, in which $R_1$, $R_2$ ... represent the radii of curvature of the various lens surfaces counting from the front, the positive sign indicating that the surface is convex to the front and the negative sign that it is concave thereto, $D_1$, $D_2$ ... represent the axial thicknesses of the individual elements, and $S_1$, $S_2$ represent the axial air separations between the elements. The tables also give the mean refractive index for the D-line and the Abbé V number of the material used for each of the elements.

*Example I*

Equivalent focal length 1.000. Relative Aperture F/4

| Radius | Thickness or Air Separation | Refractive Index $n_D$ | Abbé V Number |
|---|---|---|---|
| $R_1+.2815$ | $D_1$ .0930 | 1.644 | 48.3 |
| $R_2-.4022$ | $D_2$ .0445 | 1.750 | 27.8 |
| $R_3+1.300$ | $S_1$ .3166 | | |
| $R_4-.1434$ | $D_3$ .0198 | 1.644 | 48.3 |
| $R_5+.5353$ | $S_2$ .0020 | | |
| $R_6+.6828$ | $D_4$ .0346 | 1.676 | 32.3 |
| $R_7-.2385$ | | | |

*Example II*

Equivalent focal length 1.000. Relative Aperture F/4.5

| Radius | Thickness or Air Separation | Refractive Index $n_D$ | Abbé V Number |
|---|---|---|---|
| $R_1+.2481$ | $D_1$ .0918 | 1.644 | 48.3 |
| $R_2-.3370$ | $D_2$ .0225 | 1.699 | 30.3 |
| $R_3+.6974$ | $S_1$ .2637 | | |
| $R_4-.1367$ | $D_3$ .0078 | 1.644 | 48.3 |
| $R_5-.6934$ | $D_4$ .0518 | 1.652 | 33.5 |
| $R_6-.2139$ | | | |

*Example III*

Equivalent focal length 1.000. Relative Aperture F/4.5

| Radius | Thickness or Air Separation | Refractive Index $n_D$ | Abbé V Number |
|---|---|---|---|
| $R_1+.2331$ | $D_1$ .0634 | 1.6437 | 48.3 |
| $R_2-.5133$ | $D_2$ .0113 | 1.7492 | 27.8 |
| $R_3+.7566$ | $S_1$ .2709 | | |
| $R_4-.1416$ | $D_3$ .0082 | 1.6437 | 48.3 |
| $R_5-.4550$ | $D_4$ .0409 | 1.7492 | 27.8 |
| $R_6-.2487$ | | | |

*Example IV*

Equivalent focal length 1.000. Relative Aperture F/4

| Radius | Thickness or Air Separation | Refractive Index $n_D$ | Abbé V Number |
|---|---|---|---|
| $R_1+.2658$ | $D_1$ .0925 | 1.744 | 45.5 |
| $R_2-.8288$ | $S_1$ .0005 | | |
| $R_3-.7886$ | $D_2$ .0259 | 1.802 | 25.5 |
| $R_4+.5525$ | $S_2$ .2631 | | |
| $R_5-.1363$ | $D_3$ .0120 | 1.644 | 48.3 |
| $R_6-1.626$ | $D_4$ .0408 | 1.621 | 36.1 |
| $R_7-.1865$ | | | |

*Example V*

Equivalent focal length 1.000. Relative Aperture F/4

| Radius | Thickness or Air Separation | Refractive Index $n_D$ | Abbé V Number |
|---|---|---|---|
| $R_1+.2705$ | $D_1$ .0941 | 1.716 | 48.1 |
| $R_2-.6750$ | $S_1$ .0005 | | |
| $R_3-.6450$ | $D_2$ .0263 | 1.750 | 27.8 |
| $R_4+.5670$ | $S_2$ .2714 | | |
| $R_5-.1367$ | $D_3$ .0122 | 1.644 | 48.3 |
| $R_6-1.570$ | $D_4$ .0374 | 1.621 | 36.1 |
| $R_7-.1823$ | | | |

It will be noticed that the first example has a cemented contact in the front member and a broken contact in the rear member, the second and third examples each have cemented contacts in both members, and the fourth and fifth examples each have a broken contact in the front member and a cemented contact in the rear member. At each broken contact there is a meniscus-shaped air space thicker at the axis than at the margin. In Example I the difference in curvature between the two contact surfaces of the rear member is approximately .40 times the equivalent power of the objective. The difference in curvature between the two contact surfaces of the front member is about .06 in Example IV and about .07 in Example V.

The numerical sum of the front and rear radii of the objective is .5200 in Example I, .4650 in Example II, .4818 in Example III, .4523 in Example IV, and .4528 in Example V.

What I claim as my invention and declare to secure by Letters Patent is:

1. An optical objective of the telephoto type, corrected for spherical and chromatic aberrations, coma, astigmatism, and field curvature, and comprising a front convergent doublet member whose cooperating internal contact surfaces are concave to the front and whose front surface is convex to the front with radius of curvature between .22 and .35 times the equivalent focal length of the objective, and a rear divergent doublet member separated from the front member by an axial air space between .25 and .35 times such equivalent focal length and having its front and rear surfaces concave to the front, the front surface of the rear member having radius of curvature between .125 and .20 times the said equivalent focal length, all four elements of the objective being made of materials having mean refractive index greater than 1.61, whilst any axial separation between the cooperating contact surfaces in either member is not greater than .010 times the said equivalent focal length.

2. An optical objective as claimed in claim 1, in which the cooperating internal contact surfaces of the convergent front member have radii of curvature lying between .25 and 1.5 times the equivalent focal length of the objective.

3. An optical objective as claimed in claim 1, in which the cooperating internal contact surfaces of the convergent front member are cemented together, the radius of curvature of such surfaces lying between .25 and 1.5 times the equivalent focal length of the objective, the front element being made of a material having mean refractive index less than and Abbé V number greater than the material of the rear element, the difference between such refractive indices lying between .040 and .130.

4. An optical objective as claimed in claim 1, in which the cooperating internal contact surfaces of the convergent front member are uncemented and have curvatures differing by not more than .20 times the equivalent power of the objective, the radius of curvature of the rear surface of the front element being greater than that of the front surface of the rear element, both such radii lying between .25 and 1.5 times the equivalent focal length of the objective.

5. An optical objective as claimed in claim 1, in which the cooperating internal contact surfaces of the divergent rear member are separated by a meniscus-shaped air space whose axial thickness is greater than its marginal thickness, the difference in curvature between such surfaces lying between .20 and 1.00 times the equivalent power of the objective.

6. An optical objective as claimed in claim 1, in which the materials of which the front and rear elements of the convergent front member are made respectively have an Abbé V number not less than 40.0 and an Abbé V number not greater than 32.5, whilst the material of which the front element of the divergent rear member is made has Abbé V number greater by at least 10.0 than that for the rear element of such member.

7. An optical objective as claimed in claim 1, in which the materials of which the front and rear elements of the convergent front member are made respectively have an Abbé V number not less than 40.0 and an Abbé V number not greater than 32.5, whilst the material of which the front element of the divergent rear member is made has Abbé V number greater by at least 10.0 than that for the rear element of such member, the front surface of the rear element of the convergent front member having a curvature which exceeds that of the rear surface of the front element of such member by not more than .20 times the equivalent power of the objective, both such surfaces having radii of curvature lying between .25 and 1.5 times the equivalent focal length of the objective.

8. An optical objective of the telephoto type, corrected for spherical and chromatic aberrations, coma, astigmatism and field curvature, and comprising a front convergent doublet member whose cooperating internal contact surfaces are concave to the front and whose front surface is convex to the front with radius of curvature between .22 and .35 times the equivalent focal length of the objective, and a rear divergent doublet member separated from the front member by an axial air space between .25 and .35 times such equivalent focal length and having its front and rear surfaces concave to the front, the front surface of the rear member having radius of curvature between .125 and .20 times the said equivalent focal length, all four elements of the objective being made of materials having mean refractive index greater than 1.61, whilst any axial separation between the cooperating contact surfaces in either member is not greater than .010 times the said equivalent focal length, the numerical sum of the radii of curvature of the front surface of the convergent front member and of the rear surface of the divergent rear member lying between .44 and .54 times the said equivalent focal length.

9. An optical objective as claimed in claim 8, in which the cooperating internal contact surfaces of the convergent front member are cemented together, the radius of curvature of such surfaces lying between .25 and 1.5 times the equivalent focal length of the objective, the front element being made of a material having mean refractive index less than and Abbé V number greater than the material of the rear element, the difference between such refractive indices lying between .040 and .130.

10. An optical objective as claimed in claim 8, in which the cooperating internal contact surfaces of the convergent front member are uncemented and have curvatures differing by not more than .20 times the equivalent power of the objective, the radius of curvature of the rear surface of the front element being greater than that of the front surface of the rear element, both such radii lying between .25 and 1.5 times the equivalent focal length of the objective.

11. An optical objective as claimed in claim 8, in which the cooperating internal contact surfaces of the divergent rear member are separated by a meniscus-shaped air space whose axial thickness is greater than its marginal thickness, the difference in curvature between such surfaces lying between .20 and 1.00 times the equivalent power of the objective, whilst the cooperating internal contact surfaces of the convergent front member have radii of curvature lying between .25 and 1.5 times the equivalent focal length of the objective.

12. An optical objective as claimed in claim 8, in which the materials of which the front and rear elements of the convergent front member are made respectively have an Abbé V number not less than 40.0 and an Abbé V number not greater than 32.5, whilst the material of which the front element of the divergent rear member is made has Abbé V number greater by at least 10.0 than that for the rear element of such member.

13. An optical objective of the telephoto type, corrected for spherical and chromatic aberrations, coma, astigmatism and field curvature, and comprising a front convergent doublet member having a cemented internal contact surface concave to the front with radius of curvature between .25 and 1.5 times the equivalent focal length of the objective and a front surface convex to the front with radius of curvature between .22 and .35 times such equivalent focal length, the mean refractive index of the rear element of such member exceeding that of the front element by an amount between .040 and .130, and a rear divergent doublet member of meniscus form having its front surface concave to the front with radius of curvature between .125 and .20 times the said equivalent focal length and having its cooperating internal contact surfaces separated by a meniscus-shaped air space whose axial thickness is not greater than .010 times the said equivalent focal length but is greater than its marginal thickness, the difference in curvature between such contact surfaces lying between .20 and 1.00 times the equivalent power of the objective, the axial air space between the two members lying between .25 and .35 times the said equivalent focal length, all four elements of the objective being made of materials having mean refractive index greater than 1.61.

14. An optical objective as claimed in claim 13, in which the materials of which the front and rear elements of the convergent front member are made respectively have an Abbé V number not less than 40.0 and an Abbé V number not greater than 32.5, whilst the material of which the front element of the divergent rear member is made has Abbé V number greater by at least 10.0 than that for the rear element of such member.

15. An optical objective of the telephoto type, corrected for spherical and chromatic aberrations, coma, astigmatism and field curvature, and comprising a front convergent meniscus doublet member having its external surfaces convex to the front and its cooperating internal contact surfaces concave to the front, the radii of curvature of the front and rear surfaces of such member respectively lying between .22 and .35 and between .4 and 2.0 times the equivalent focal length of the objective, and a rear divergent meniscus doublet member separated from the front member by an axial distance between .25 and .35 times such equivalent focal length and having its front and rear surfaces concave to the front with radii of curvature respectively lying between .125 and .20 and between .16 and .35 times the said equivalent focal length, all four elements of the objective being made of materials having mean refractive index greater than 1.61, whilst any axial separation between the cooperating internal contact surfaces in either member is not greater than .010 times the said equivalent focal length.

16. An optical objective as claimed in claim 15, in which the cooperating internal contact surfaces of the convergent front member are cemented together, the radius of curvature of such surfaces lying between .25 and 1.5 times the equivalent focal length of the objective, the front element being made of a material having mean refractive index less than and Abbé V number greater than the material of the rear element, the difference between such refractive indices lying between .040 and .130.

17. An optical objective as claimed in claim 15, in which the cooperating internal contact surfaces of the convergent front member are uncemented and have curvatures differing by not more than .20 times the equivalent power of the objective, the radius of curvature of the rear surface of the front element being greater than that of the front surface of the rear element, both such radii lying between .25 and 1.5 times the equivalent focal length of the objective.

18. An optical objective as claimed in claim 15, in which the cooperating internal contact surfaces of the divergent rear member are separated by a meniscus-shaped air space whose axial thickness is greater than its marginal thickness, the difference in curvature between such surfaces lying between .20 and 1.00 times the equivalent power of the objective.

19. An optical objective as claimed in claim 15, in which the materials of which the front and rear elements of the convergent front member are made respectively have an Abbé V number not less than 40.0 and an Abbé V number not greater than 32.5, whilst the material of which the front element of the divergent rear member is made has Abbé V number greater by at least 10.0 than that for the rear element of such member.

20. An optical objective of the telephoto type having numerical data substantially as set forth in the following table, wherein $R_1$, $R_2$ . . . represents the radii of curvature of the various surfaces, the positive sign indicating that the surface is convex to the front and the negative sign that it is concave thereto, $D_1$, $D_2$ . . . represent the axial thicknesses of the individual elements, and $S_1$, $S_2$ represent the axial air separations between the elements:

| Equivalent focal length 1.000. Relative Aperture F/4 | | | |
|---|---|---|---|
| Radius | Thickness or Air Separation | Refractive Index $n_D$ | Abbé V Number |
| $R_1$+.2815 | $D_1$ .0930 | 1.644 | 48.3 |
| $R_2$−.4022 | $D_2$ .0445 | 1.750 | 27.8 |
| $R_3$+1.300 | $S_1$ .3166 | | |
| $R_4$−.1434 | $D_3$ .0198 | 1.644 | 48.3 |
| $R_5$+.5353 | $S_2$ .0020 | | |
| $R_6$+.6828 | $D_4$ .0346 | 1.676 | 32.3 |
| $R_7$−.2385 | | | |

21. An optical objective of the telephoto type having numerical data substantially as set forth in the following table, wherein $R_1$, $R_2$ . . . represent the radii of curvature of the various surfaces, the positive sign indicating that the surface is convex to the front and the negative sign that it is concave thereto, $D_1$, $D_2$ . . . represent the axial thicknesses of the individual elements, and $S_1$, $S_2$ represent the axial air separations between the elements:

| Equivalent focal length 1.000. Relative Aperture F/4.5 | | | |
|---|---|---|---|
| Radius | Thickness or Air Separation | Refractive Index $n_D$ | Abbé V Number |
| $R_1$+.2331 | $D_1$ .9634 | 1.6437 | 48.3 |
| $R_2$−.5133 | $D_2$ .0113 | 1.7492 | 27.8 |
| $R_3$+.7566 | $S_1$ .2709 | | |
| $R_4$−.1416 | $D_3$ .0082 | 1.6437 | 48.3 |
| $R_5$−.4550 | $D_4$ .0409 | 1.7492 | 27.8 |
| $R_6$−.2487 | | | |

22. An optical objective of the telephoto type having numerical data substantially as set forth in the following table, wherein $R_1$, $R_2$ . . . represent the radii of curvature of the various surfaces, the positive sign indicating that the surface is convex to the front and the negative sign that it is concave thereto, $D_1$, $D_2$ . . . represent the axial thicknesses of the individual elements, and $S_1$, $S_2$ represent the axial air separations between the elements:

| Equivalent focal length 1.000. Relative Aperture F/4 | | | |
|---|---|---|---|
| Radius | Thickness or Air Separation | Refractive Index $n_D$ | Abbé V Number |
| $R_1$+.2705 | $D_1$ .0941 | 1.716 | 48.1 |
| $R_2$−.6750 | $S_1$ .0005 | | |
| $R_3$−.6450 | $D_2$ .0263 | 1.750 | 27.8 |
| $R_4$+.5670 | $S_2$ .2714 | | |
| $R_5$−.1367 | $D_3$ .0122 | 1.644 | 48.3 |
| $R_6$−1.570 | $D_4$ .0374 | 1.621 | 36.1 |
| $R_7$−.1823 | | | |

ARTHUR COX.

(References on following page)

REFERENCES CITED

The following references are of record in the file of this patent:

UNITED STATES PATENTS

| Number | Name | Date |
|---|---|---|
| 1,156,743 | Booth | Oct. 12, 1915 |
| 1,485,515 | Merte | Mar. 4, 1924 |
| 1,573,999 | Richter | Feb. 23, 1926 |
| 2,239,538 | Richter | Apr. 22, 1941 |
| 2,390,387 | Rayton et al. | Dec. 4, 1945 |

FOREIGN PATENTS

| Number | Country | Date |
|---|---|---|
| 151,507 | Great Britain | Sept. 30, 1920 |